United States Patent [19]

Margulies et al.

[11] B 3,923,545

[45] Dec. 2, 1975

[54] GRID STRUCTURE FOR HIGH RATE LEAD/ACID BATTERY

[75] Inventors: Robert S. Margulies, Redondo Beach, Calif.; Royce E. Biddick, Edina, Minn.

[73] Assignee: The United States of America as represented by the United States Environmental Protection Agency, Washington, D.C.

[22] Filed: Mar. 30, 1973

[21] Appl. No.: 346,613

[44] Published under the Trial Voluntary Protest Program on January 28, 1975 as document no. B 346,613.

[52] U.S. Cl. ................................................. 136/36
[51] Int. Cl.² ........................................... H01M 4/73
[58] Field of Search ............................. 136/36–38, 136/48, 79, 26, 9; 29/2

[56] References Cited
UNITED STATES PATENTS

| | | | |
|---|---|---|---|
| 1,370,013 | 3/1921 | Ford | 136/48 |
| 1,376,929 | 5/1921 | Ford | 136/48 |
| 1,508,776 | 9/1924 | Cook | 136/48 |
| 2,064,324 | 12/1936 | Schnaubelt | 136/38 |
| 2,690,464 | 9/1954 | Harris | 136/36 |

FOREIGN PATENTS OR APPLICATIONS

| | | | |
|---|---|---|---|
| 577,719 | 6/1959 | Canada | 136/36 |
| 436,266 | 10/1935 | United Kingdom | 136/36 |

*Primary Examiner*—Anthony Skapars

[57] ABSTRACT

An improved electrode grid structure is formed wherein at least two equispaced current-carrying separators are tapered in width and intersect at the widest portion perpendicular to a tapered side element having a current collecting tab. In addition, the number of current-carrying separators parallel to the tapered current-carrying separators is greater than the number of current-carrying separators perpendicular to the tapered current-carrying separators. The purpose of the structure is to maximize mechanical support while minimizing the resistive paths in regions of highest current density.

6 Claims, 1 Drawing Figure

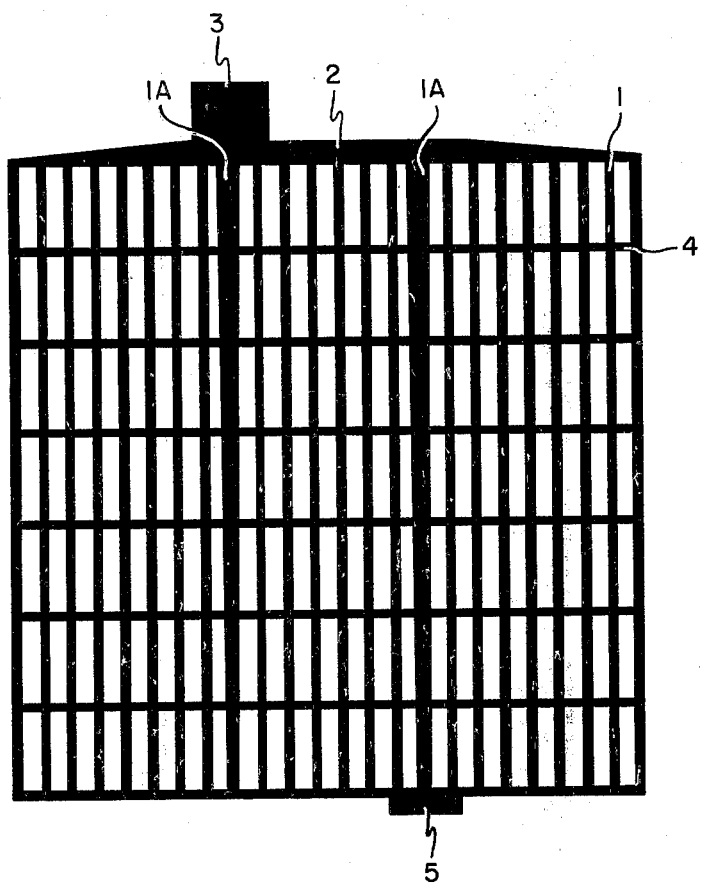

GRID STRUCTURE FOR HIGH RATE LEAD/ACID BATTERY

BACKGROUND OF THE INVENTION

U.S. Pat. No. 1,214,210 to Mills discloses a storage-battery plate wherein the tops of several of the bars nearest the terminal lug are preferably thickened or reinforced to provide necessary strength and rigidity, and at the same time, the increased area of the strips provides ample current-carrying capacity in the region of the terminal lug where the current is the greatest. Mills' plate, however, does not provide a uniform resistance between any point on the plate and the terminal lug. Thus, while Mills' storage battery plate teaches a tapering of the current-carrying separators, the tapered separators and the rest of the grid structure are not arranged so as to provide minimum resistance in the grid plate.

U.S. Pat. No. 1,370,013 to Ford discloses a storage battery plate having a relatively larger number of vertical grid bars than norizontal grid bars. Ford teaches that a larger number of vertical grid bars is desirable because the current generated in the plate travels mostly in a vertical direction towards the plate connection lug. Although Ford employs a greater number of grid rods running into the edge of the plate containing the connector lug, Ford does not taper any of the grid bars whereby the resistance would be diminished. Thus, the resistive path between various points on the grid plate and the terminal lug will vary, and optimum uniform power output from each grid pellet will not be achieved.

SUMMARY OF THE INVENTION

Grid resistance limits the power output of a lead-acid battery. The present invention, therefore, teaches a grid structure which improves the power to weight ratio of the lead-acid battery. It has been found that the use of tapered structural elements with the thickest part of the element in the region of highest current density will substantially improve the efficiency of a battery plate. Thus, a battery plate may be produced which has low resistance in grid members carrying the greatest current by using a greater number of current-carrying members in the elements intersecting with the tapered side of the grid structure having the current-collecting tab as opposed to the number of current-carrying members running parallel to the tapered side of the grid, and by tapering at least two of the more numerous current-carrying elements equispaced from one side of the grid structure to the opposite side of the grid structure so that the widest portion of the tapered current-carrying elements intersect with the tapered side of the grid structure at the widest points.

BRIEF DESCRIPTION OF THE DRAWING

The FIGURE in the drawing is an elevation of a grid structure for a lead-acid battery according to the present invention.

DESCRIPTION OF THE PREFERRED EMBODIMENTS

A grid structure in a lead-acid battery having improved power to weight ratio may be accomplished by placing the lead where it maximizes mechanical support and minimizes the resistive paths in regions of highest current density. Power output of a lead-acid battery is limited by grid resistance, thus, any design which will reduce grid resistance will increase the power output of the battery. Reducing grid resistance may be accomplished by simply enlarging the grid, however, the enlargement of the grid also produces an unwanted weight increase. Therefore, in order to reduce the grid resistance without increasing the weight of the grid by adding material, the grid design is arranged so that the effective resistance of the grid is minimized.

The grid design which has been found to have the optimum power output comprises a plurality of parallel current-carrying members with a fewer number of parallel current-carrying members perpendicularly intersecting one another in the same plane. One edge of the grid structure is tapered from the corners to the widest portion in the middle. A current-collector tab from which power is taken off the plate, is situated in the widest portion of this edge. Intersecting the tapered edge and perpendicular thereto in the same plane, are at least two tapered current-carrying support members which are equispaced. The taper of the support members runs from the narrowest end at the opposite side of the grid to the broadest end intersecting with the tapered edge of the grid. By placing these tapered elements in the interior of the grid, they provide maximized mechanical support as well as greater current-carrying capacity. For a better understanding of the present invention, reference is made to the FIGURE in the drawing wherein a plurality of parallel support elements 1 are perpendicular to and intersect in the same plane with tapered edge 2 having a current-collector tab 3. A fewer number of parallel cross-support separators 4 are perpendicular to and in the same plane with the more numerous separators 1. At least two of the more numerous current-carrying separators 1A are tapered and equispaced in the grid structure. Foot 5 on the bottom of the grid structure serves to support the grid structure and elevate it above the bottom of the battery case.

Obviously, if larger or smaller batteries are made, certain structural elements will have to be changed. Consideration for the structural changes is governed by the following mathematical model which optimizes the figure of merit for the pasted-grid configuration of the positive plate. The figure of merit for the plate is defined as:

$$fm = I[E-I(R_g+R_p+R_e)]/W$$

Where I is the plate current, E is the half-cell potential of the positive plate (vs. $Hg/Hg_2SO_4$), $R_g$ is the grid resistance, $R_p$ is the pellet resistance, $R_e$ is the electrolyte resistance, and W is the weight of the plate. Generally, the values of I, E, $R_e$ are fixed, while $R_g$, $R_p$ and W are varied with the grid geometry. In arriving at the figure of merit, it is assumed that Kirchhoff's laws apply for the distribution of voltage throughout the grid and for the currents delivered to the grid by the pellets. That is, the sum of the positive and negative currents entering any intersection of grid elements must be 0, and that the sum of the voltage drops around any closed path in the grid must also be 0.

In an example of a specific embodiment of the grid of this invention, a grid for a group size 22F cell was constructed having 10.8 cm on a side and 0.10 cm in overall thickness. The grid had 24 vertical elements and 8 horizontal elements with vertical elements 9 and 16 counting from one side being tapered. The current-collector tab extended from the 8th to the 10th element at the top of the grid. The width of the side and bottom frame members and the smaller end of the stiffeners was 0.10 cm and their cross-sectional area was 0.010 sq. cm. The cross-sectional areas of the vertical and the horizontal elements were 0.0026 sq. cm and 0.0052 sq. cm, respectively. The top of the tapered vertical elements and the top frame element between the tapered vertical elements had a width of 0.33 cm. The top element had a width of 0.17 cm on either side of the tapered vertical elements. A cell consisting of 10 positive plates and 11 negative plates produced a specific power of 200 watts per pound for a 20-second discharge and a specific power of 150 watts per pound for a 72-second discharge at a specific energy of 3 watt-hour per pound. This compares favorably with a conventional premium grade 61-ampere hour group size 22F cell of about the same size which produced only 70.4 watts per pound at a specific energy of 1.5 watt-hour per pound under similar conditions of temperature, time, and load.

Although grid corrosion, conductivity, and structural strength will depend upon the metals used for the grid material, it should be understood that considerations for the grid design are substantially independent of the material involved. Thus, the standard Pb-4.5% Sb grid material will exhibit outstanding efficiency improvement over conventional grid designs using the same standard alloy.

It is to be understood that various modifications and specific embodiments may be employed within the scope of the present invention. For example, upon enlargement of the grid structure, it may be necessary to provide two or more feet on the bottom of the grid for support. Likewise, some grid designs may require more than one current-collector tab, however, if such is the case, all the current-collector tabs should be located on the tapered side of the grid structure. Also, it may be necessary to increase the number of tapered current-carrying separators, but if this is done then they should be equispaced across the face of the grid. Optimization of the grid design in every case may be determined by calculation using the figure of merit.

We claim:

1. A rectangular battery grid structure comprising:
    A. at least one current-collector tab on one edge of the grid structure;
    B. a plurality of parallel current-carrying elements, wherein said element on one edge of said grid structure is tapered widest at the middle of said element and said tab is positioned at said thickest width;
    C. a plurality of parallel current-carrying elements joined at right angle to said elements in (B) wherein at least two of which are equispaced and are tapered from one side of the grid structure to the opposite side of the grid structure with the broadest width joining said tab-carrying side element in the widest section wherein the number and size of said current-carrying elements are governed by a mathematical equation:
    $$fm = I[E-I(R_g+R_p+R_e)]/W$$
    wherein I is plate current, E is half-cell potential of the plate, $R_g$ is grid resistance, $R_e$ is electrolyte resistance, and $R_p$ is pellet resistance, and W is weight of plate to give a figure of merit, fm.

2. A rectangular battery grid structure according to claim 1 wherein the number of current-carrying elements in (B) is less than the number of current-carrying elements in (C).

3. A rectangular battery grid structure according to claim 1 wherein the bottom current-carrying element has at least one support foot.

4. A rectangular pasted plate for a storage battery comprising:
    A. a plurality of rectangular pellets held in a grid pattern formed by
    B. a plurality of parallel current-carrying elements, wherein said element on one side of said grid pattern is tapered widest at the middle of said element;
    C. a plurality of parallel current-carrying elements joined at right angle with said elements in (B) wherein at least two of the elements are equispaced across the grid pattern and are tapered from one side of the grid structure to the opposite side of the grid structure with the broadest width joining said tapered element in (B) at the widest section; and
    D. a current-collector tab on said tapered element of (B) at the intersection of one of said tapered elements of (C) wherein the number and size of said current-carrying elements are governed by a mathematical equation:
    $$fm = I[E-I(R_g+R_p+R_e)]/W$$
    wherein I is plate current, E is half-cell potential of the plate, $R_g$ is grid resistance, $R_e$ is electrolyte resistance, $R_p$ is pellet resistance, and W is weight of plate to give a figure of merit, fm.

5. A pasted plate according to claim 4 wherein the number of current-carrying elements in (B) is less than the number of current-carrying elements in (C).

6. A pasted plate according to claim 4 wherein the bottom current-carrying element has at least one support foot.

* * * * *